Figure 1:
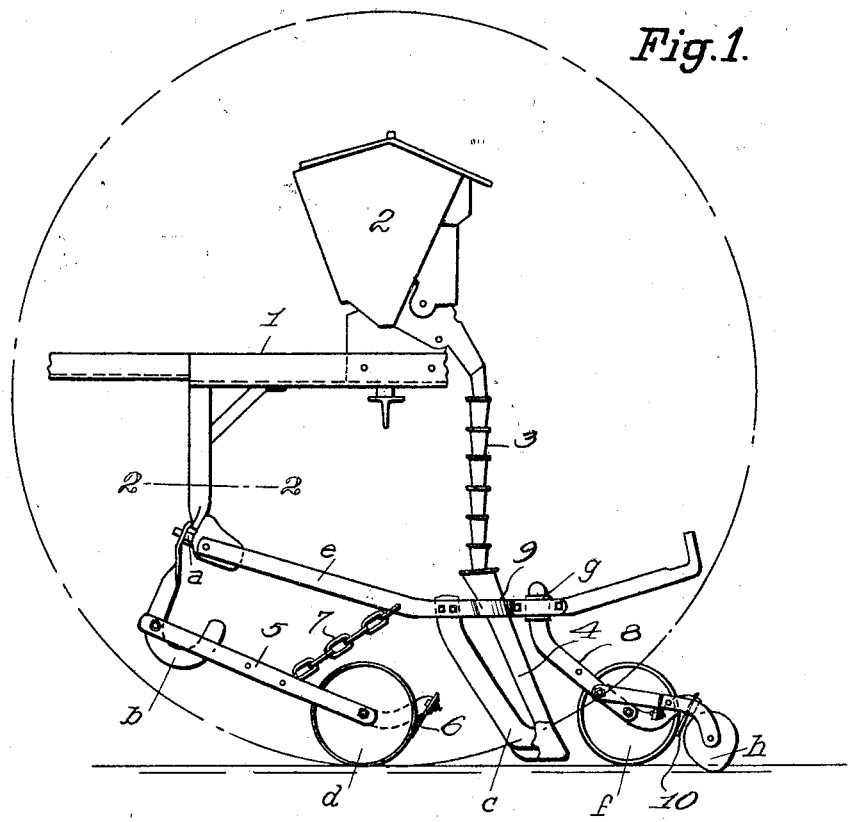

Aug. 2, 1932.  W. SIEMIENSKI  1,869,516
AGRICULTURAL IMPLEMENT

Filed July 6, 1929

Inventor:
Waclaw Siemienski
By
Attorney

Patented Aug. 2, 1932

1,869,516

UNITED STATES PATENT OFFICE

WACLAW SIEMIENSKI, OF DUBIDZE P. BRZEZNICA, POLAND

AGRICULTURAL IMPLEMENT

Application filed July 6, 1929, Serial No. 376,309, and in Poland March 16, 1929.

This invention relates to improvements in agricultural implements, and particularly to attachments for seed drillers.

It is an object of the invention to provide an attachment readily applicable to agricultural drilling implements for preparing the strip of soil to receive the seed prior to the introduction of the seed into the shallow ditch produced by the implement.

Another object of the invention is to provide an attachment of this character for adequately treating the soil subsequent to the introduction of the seed into the narrow or shallow furrow to facilitate initiation of the germination and growth of the plants.

It is, therefore, also an object of the invention to provide an attachment for slightly compacting the soil over and about the seeds deposited therein to permit the rootlets to have a firmer hold on the soil than if the latter were loosely only thrown about the seeds.

It is, furthermore, an object of the invention to provide an attachment of this character which facilitates the adjustment of the depth to which the tool producing the shallow ditch may be forced into the ground.

With these and numerous other objects in view, the invention is described in the following specification in which a reference is made to the accompanying drawing.

Figure 2:
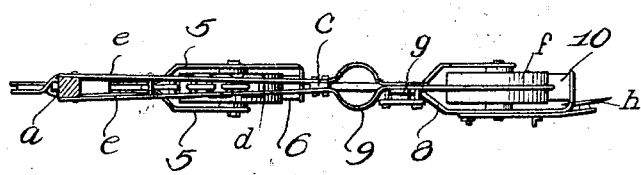

In the drawing:

Fig. 1 illustrates a front elevation of the attachment for an agricultural driller, and Fig. 2 is a top plan view of said attachment.

The frame 1 of the ordinary agricultural machine is provided with the seed container 2 from which the flexible tubes 3 conduct the seeds in approximately predetermined quantities to the ejector tube 4 from which they are discharged into the drills produced by the machine. The parts just described are well known in the art and do not require any further detailed explanation.

A bracket $a$ forming a part of an extension to the frame 1 serves for suspension means of a hook shaped support $b$ to which a pair of bars 5 is adjustably connected, said bars being spaced at their rear ends to receive between them rotatably the roller or wheel $d$. The latter exerts in the travel of the machine over the ground a uniform pressure upon the strip of soil in contact with the lowermost point of the wheel during the rotation thereof so as to prepare this soil for the formation of the narrow ditch or drill into which the seeds are to be deposited.

A scraper 6 may be connected with one of the bars 5 for removing soil which might adhere to the circumference of the roller $d$. The supporting structure for this roller $d$ formed of the bars 5 may be adjusted relatively to the suspension hook $b$, but this structure also is connected by means of a chain 7 with an extension $e$ projecting from the bracket at the rear end of the frame. This extension also is pivotally connected with the bracket and is formed by a set of approximately parallel bars to which the drilling tool $c$ in the form of a narrow plough share is fixedly connected. The bars of the extension structure $e$ are separated from each other adjacent the attachment point 8 of the drill shoe $c$ to form an opening 9 for the passage of the ejector tube 4.

This extension structure $e$, furthermore, is supported from the ground to be tilled by an additional roller or wheel $f$ rotatably supported in a second suspension structure 8 which is clamped through an adjustable clamp $g$ to the main extension structure $e$. The suspension structure 8 for this second roller or wheel $f$ is of such formation that it will permit the top of the extension structure to project more or less beyond the extension structure $e$ so as to vary the height of said last named extension structure above the ground.

The suspension structure 8 for the second roller $f$ also serves as a support for a scraper 10 acting on the circumference of this second roller $f$, and to this suspension structure 8 also is connected a disc or plate $h$ serving as a share for throwing loose soil over that strip of the ground which had been rolled over by the wheel $f$. It will be obvious from the description of the device that the roller $d$ in the travel of the implement over the ground will compact a strip of soil to impart to the same approximately uniform resistance against the action of the share *c* which produces the drill. It will also be obvious that during this travel the second roller *f* will again compact the soil over the same strip after the seed has been deposited in the drill, and that owing to this compactness the young plant immediately will obtain a firmer grip on the soil by means of its rootlets as soon as the latter have appeared. This action of compacting the soil immediately over the drill also has a favorable influence upon the moisture contents and will assure a uniform and improved feed of the substances in the soil on which the growth of the plan is conditioned.

I claim:

In combination with the frame of an agricultural machine, a bracket depending therefrom, an extension beam pivotally connected at its front end to the bracket, a hook shaped support depending from the bracket, a drill opener and an ejector tube carried by the extension beam, a pair of bars spaced apart arranged on opposite sides of the hook shaped support and pivotally connected thereto at their front ends, a roller mounted between the rear ends of said bars for rotation and connecting means between the rear portion of said bars and the said extension beam and said roller and the said pair of bars being arranged in advance of the drill opener.

In witness whereof I affix my signature.

WACLAW SIEMIENSKI.